US012260148B1

(12) United States Patent
Wang

(10) Patent No.: US 12,260,148 B1
(45) Date of Patent: Mar. 25, 2025

(54) VIDEO PROJECTION SWITCHING APPARATUS

(71) Applicant: Chuchu Wang, Guizhou (CN)

(72) Inventor: Chuchu Wang, Guizhou (CN)

( * ) Notice: Subject to any disclaimer, the term of this patent is extended or adjusted under 35 U.S.C. 154(b) by 0 days.

(21) Appl. No.: 18/928,333

(22) Filed: Oct. 28, 2024

(51) Int. Cl.
  *G06F 3/14* (2006.01)
  *G06F 3/16* (2006.01)
(52) U.S. Cl.
  CPC ............ *G06F 3/1454* (2013.01); *G06F 3/165* (2013.01)
(58) Field of Classification Search
  CPC ........... G06F 3/1454; G06F 3/023; G06F 3/14
  See application file for complete search history.

(56) References Cited

U.S. PATENT DOCUMENTS

| | | | | |
|---|---|---|---|---|
| 2005/0259112 | A1* | 11/2005 | Suzukawa | G06F 3/14 345/603 |
| 2011/0225537 | A1* | 9/2011 | Wang | G06F 1/181 715/778 |
| 2020/0389691 | A1* | 12/2020 | Yoshizawa | G09G 3/20 |

* cited by examiner

*Primary Examiner* — Gustavo Polo

(57) ABSTRACT

A video projection switching apparatus includes a screen interface, a display controller, a switching unit, and a plurality of input interfaces. At least two of the input interfaces are electrically connected to the display controller and used for connecting to external input devices. The screen interface is used for connecting to a display screen. The display controller is electrically connected to the switching unit and the screen interface. When at least two input interfaces both input video signals, the display controller first outputs a video signal input from one of the at least two input interfaces through the screen interface according to a preset program. The switching unit outputs a switching signal to the display controller when a user operates. The display controller selects to output a video signal input from another one of the at least two input interfaces through the screen interface when receiving the switching signal.

20 Claims, 18 Drawing Sheets

231

```
          SCS642U06
1_CTX1+ 10 ┌─────────┐  1  1_CTX1+
 1_CTX1-  9 │NC1  Lin1│  2  1_CTX1-
          8 │NC2  Lin2│  3
 1_CRX1+  7 │GND_1 GND_0│ 4  1_CRX1+
 1_CRX1-  6 │NC3  Lin3│  5  1_CRX1-
            │NC4  Lin4│
            └─────────┘
              UX6

UX7
          ┌─────────┐
1_CSBU1  6 │NC4  Lin4│ 5  1_CSBU1
1_CSBU2  7 │NC3      │ 4  1_CSBU2
         8 │     Lin3│ 3
 1_DM0   9 │GND_1 GND_0│ 2  1_DM0
 1_DP0  10 │NC2  Lin2│ 1  1_DP0
           │NC1  Lin1│
           └─────────┘
          SCS642U06

SCS642U06
1_CTX2- 10 ┌─────────┐  1  1_CTX2-
 1_CTX2+  9 │NC1  Lin1│  2  1_CTX2+
          8 │NC2  Lin2│  3
 1_CRX2+  7 │GND_1 GND_0│ 4  1_CRX2+
 1_CRX2-  6 │NC3  Lin3│  5  1_CRX2-
            │NC4  Lin4│
            └─────────┘
              UX8
```

FIG. 5

VIDEO PROJECTION SWITCHING APPARATUS

TECHNICAL FIELD

The present invention relates to the technical field of switchers, particularly to a video projection switching apparatus.

BACKGROUND ART

With the development of technology and the improvement of people's living standards, mobile phones and computers can be used for work and entertainment in more and more office settings. It is often necessary to share the screens of different people's mobile phones and computers on a large display screen for conference attendees to watch together, especially when multiple people are in conference. At present, the video projection display on the market can only share the screen of one mobile phone on one monitor, or share the screen of one computer on one monitor, and cannot directly connect the screens of a plurality of computers or mobile phones to one monitor for use. This problem causes that when the screens of a plurality of computers need to be shared in a meeting, the display screen needs to be connected to the corresponding computer to project images displayed on the screen of the computer, which greatly affects the efficiency of the meeting and leads to the slow progress of the meeting.

SUMMARY

The main purpose of the present invention is to provide a video projection switching apparatus, for solving the problem that a plurality of screens of mobile phones or computers cannot be simultaneously connected to one display screen for switching use.

In order to solve the above technical problem, the following technical solution is provided in the present invention.

A video projection switching apparatus includes a screen interface, a display controller, a power module, a switching unit, and a plurality of input interfaces.

At least two input interfaces of the plurality of input interfaces are electrically connected to the display controller and used for connecting to external input devices to input video signals. At least one input interface of the plurality of input interfaces is electrically connected to the power module and used for connecting to a power supply. The screen interface is used for connecting to a display screen. The display controller is electrically connected to the power module, the switching unit, and the screen interface, respectively.

When at least two input interfaces both input video signals, the display controller first outputs a video signal input from one input interface of the at least two input interfaces through the screen interface according to a preset program. The switching unit outputs a switching signal to the display controller when a user operates. When the display controller receives the switching signal, the display controller selects to output a video signal input from another input interface of the at least two input interfaces through the screen interface. The power module processes power input from one input interface of the at least one input interface and then supplies the power to the display controller for use.

Furthermore, the preset program is set that when at least two input interfaces both input video signals, the display controller outputs a video signal, which is input first or last, through the screen interface.

Furthermore, the preset program is set that when at least two input interfaces both input video signals, the display controller specifies a video signal input from one input interface of the at least two input interfaces to be to output through the screen interface.

Furthermore, the switching unit is a switch.

Furthermore, the power module is also electrically connected to the screen interface, and the power module also processes power input from the input interface and then supplies the power to the display screen through the screen interface.

Furthermore, the input interface includes a first device interface and a second device interface. The display controller and the power module are both electrically connected to the first device interface and the second device interface. The first device interface and the second device interface are both used for connecting to external devices and for inputting video signals and/or power from the input devices. The power module includes a protocol chip and a power circuit. The protocol chip is electrically connected to the first device interface, the second device interface, the display controller, and the power circuit, respectively. The power circuit is also electrically connected to the display controller and the screen interface.

The protocol chip is used for transmitting power input from the first device interface or the second device interface to the display controller and the screen interface through the power circuit.

Furthermore, when the protocol chip detects that the input device is a charging device through the first device interface, the protocol chip outputs power input from the second device interface through the first device interface.

Furthermore, when the protocol chip detects that the input device is a charging device through the second device interface, the protocol chip outputs the power input from the first device interface through the second device interface.

Furthermore, both the first device interface and the second device interface are Type-c interfaces.

Furthermore, the video projection switching apparatus further includes a first electrostatic protection component and a second electrostatic protection component. The first electrostatic protection component is electrically connected to the first device interface, and the second electrostatic protection component is electrically connected to the second device interface.

Furthermore, the power circuit includes a first power unit, a second power unit, a peripheral power unit, and a third power unit. The first power unit is electrically connected to the second power unit, the peripheral power unit, the third power unit, and the protocol chip, respectively.

The protocol chip processes the power input from the first device interface or the second device interface into a first voltage and outputs the first voltage to the first power unit. The first power unit is used for processing the first voltage into a second voltage and outputting the second voltage to the second power unit, the peripheral power unit, and the third power unit, respectively. The second power unit is used for processing the second voltage into a third voltage for use by the display controller. The peripheral power unit is used for processing the second voltage into a peripheral voltage for use by the display controller. The third power unit is used for processing the second voltage into a fourth voltage and then outputting the fourth voltage through the screen interface.

Furthermore, the video projection switching apparatus further includes an audio amplifier and a player interface for connecting to an audio player. The audio amplifier is electrically connected to the power module, the player interface, and the display controller, respectively. The display controller is also used for amplifying audio data input from the input interface through the audio amplifier and then outputting the audio data through the player interface.

Furthermore, the video projection switching apparatus further includes an earphone interface for connecting to an external earphone. The earphone interface is electrically connected to the display controller. The display controller is also used for outputting the audio data input from the input interface through the earphone interface.

Furthermore, the video projection switching apparatus further includes a switch unit. The switch unit is electrically connected to the display controller and the audio amplifier, respectively. The display controller is also used for outputting a cut-off signal to the audio player through the switch unit when the display controller detects that the earphone interface is connected to the earphone. The audio amplifier receives the cut-off signal and stops outputting the audio data through the player interface.

Furthermore, the video projection switching apparatus further includes a memory for storing data, and the memory is electrically connected to the display controller.

Furthermore, the video projection switching apparatus further includes a clock unit. The clock unit is electrically connected to the display controller.

Furthermore, the input interface further includes a third device interface for connecting to an external input device. The third device interface is electrically connected to the display controller for transmitting a video signal transmitted from the input device to the display controller. Furthermore, the third device interface is an HDMI interface.

Furthermore, the display controller is an eDP driver chip.

Furthermore, the eDP driver chip is used for supporting connection of two DP1.4 digital input interfaces with HDCP1.4 and one HDMI1.4 digital input interface with HDCP1.4, and is used for supporting a screen interface with an output connection resolution of 1920×1080 @ 60 hz.

The present invention has the following beneficial effects. Compared with the prior art, in this embodiment, the plurality of input interfaces are configured for inputting a plurality of video signals, and the signals are transmitted to the display controller. The display controller first specifies one of the video signals to be transmitted to the display screen for display through the screen interface according to the internal preset program. The display controller selects to output the video signal input from another input interface through the screen interface when receiving the switching signal. In this way, during a meeting or when the user has a plurality of hosts, the video projection switching apparatus 100 in this embodiment can simultaneously be connected to a plurality of input devices, so that one display screen shows the video signals output from the input devices that the user needs to project onto the screen. This solves the problem of cumbersome operation of connecting a data cable that is connected to the display screen to a corresponding input device when each input device needs to project video signals onto the screen, making it convenient for the user to use, saving meeting time, and improving meeting efficiency.

BRIEF DESCRIPTION OF THE DRAWINGS

Implementations of the present disclosure will now be described, by way of embodiment, with reference to the attached figures. It should be understood, the drawings are shown for illustrative purpose only, for ordinary person skilled in the art, other drawings obtained from these drawings without paying creative labor by an ordinary person skilled in the art should be within scope of the present disclosure.

FIG. 5 is a circuit diagram of a second electrostatic protection component of the present invention.

DETAILED DESCRIPTION OF THE EMBODIMENTS

Figure 1:
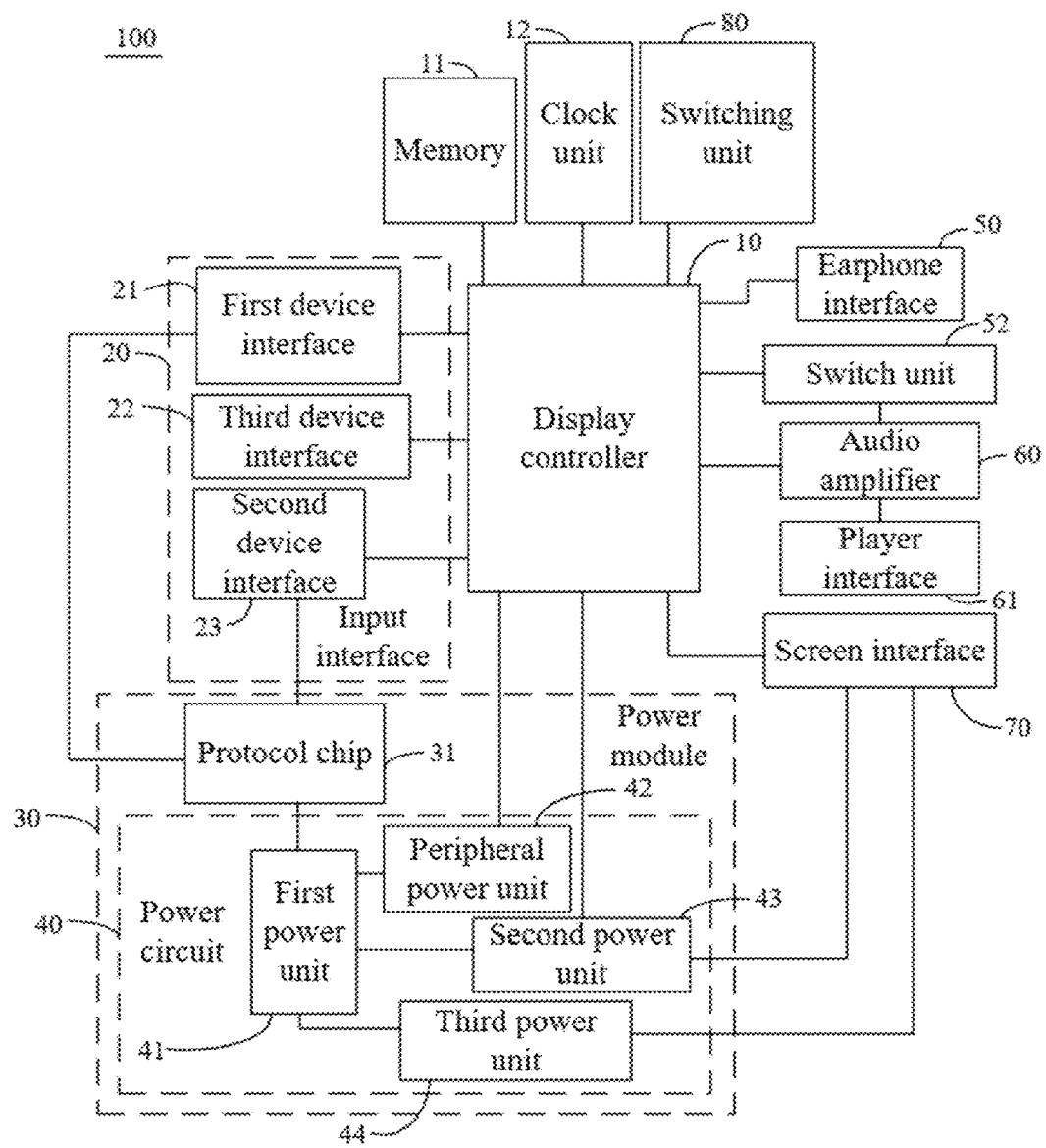
FIG. 1 is a principle block diagram of the present invention.
Figure 2:
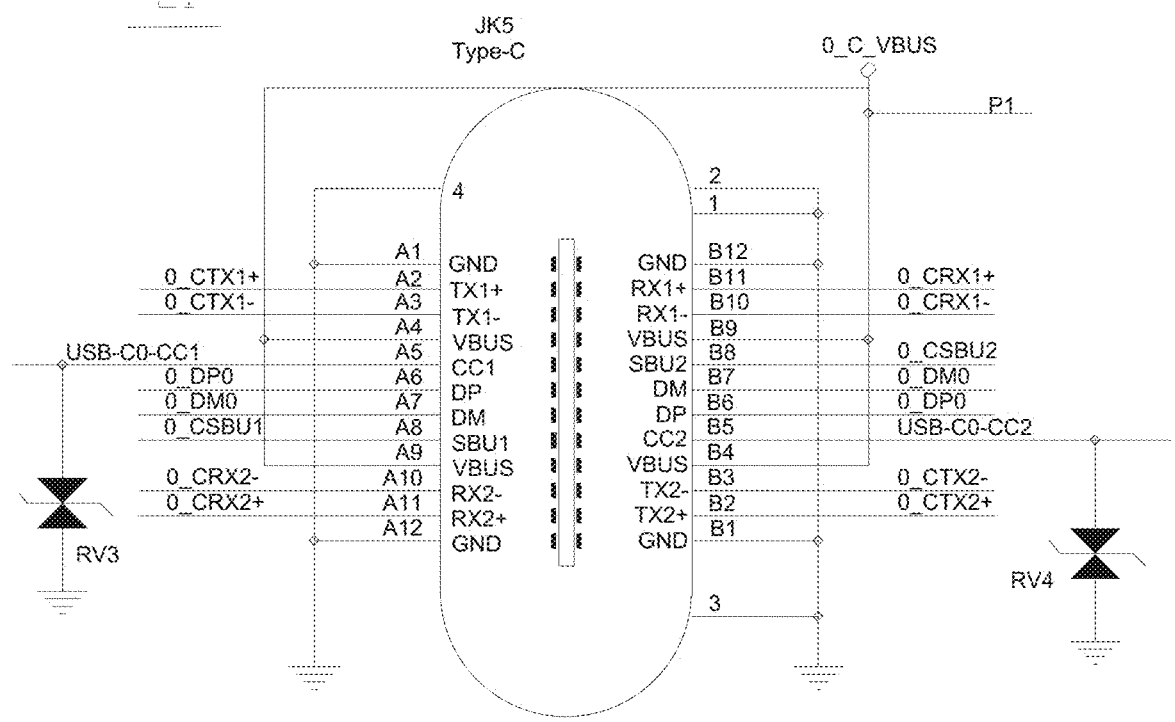
FIG. 2 is a circuit diagram of a first device interface of the present invention.
Figure 3:
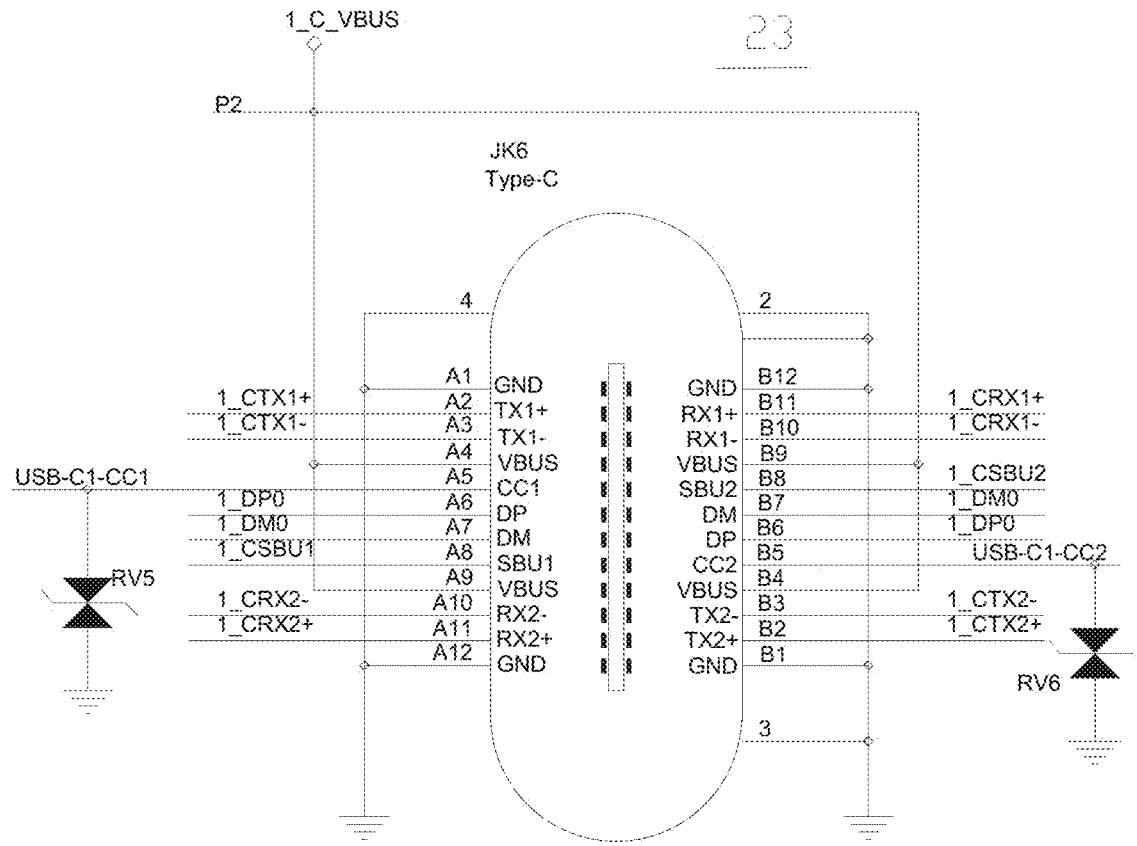
FIG. 3 is a circuit diagram of a second device interface of the present invention.
Figure 4:
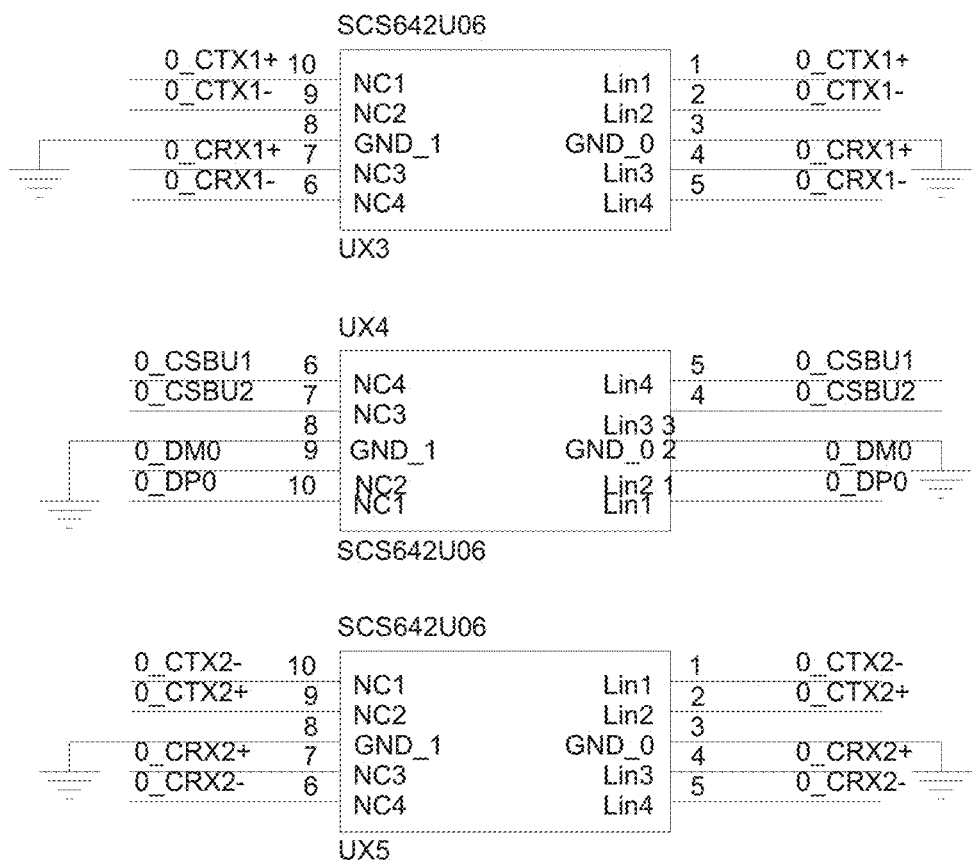
FIG. 4 is a circuit diagram of a first electrostatic protection component of the present invention.
Figure 6:
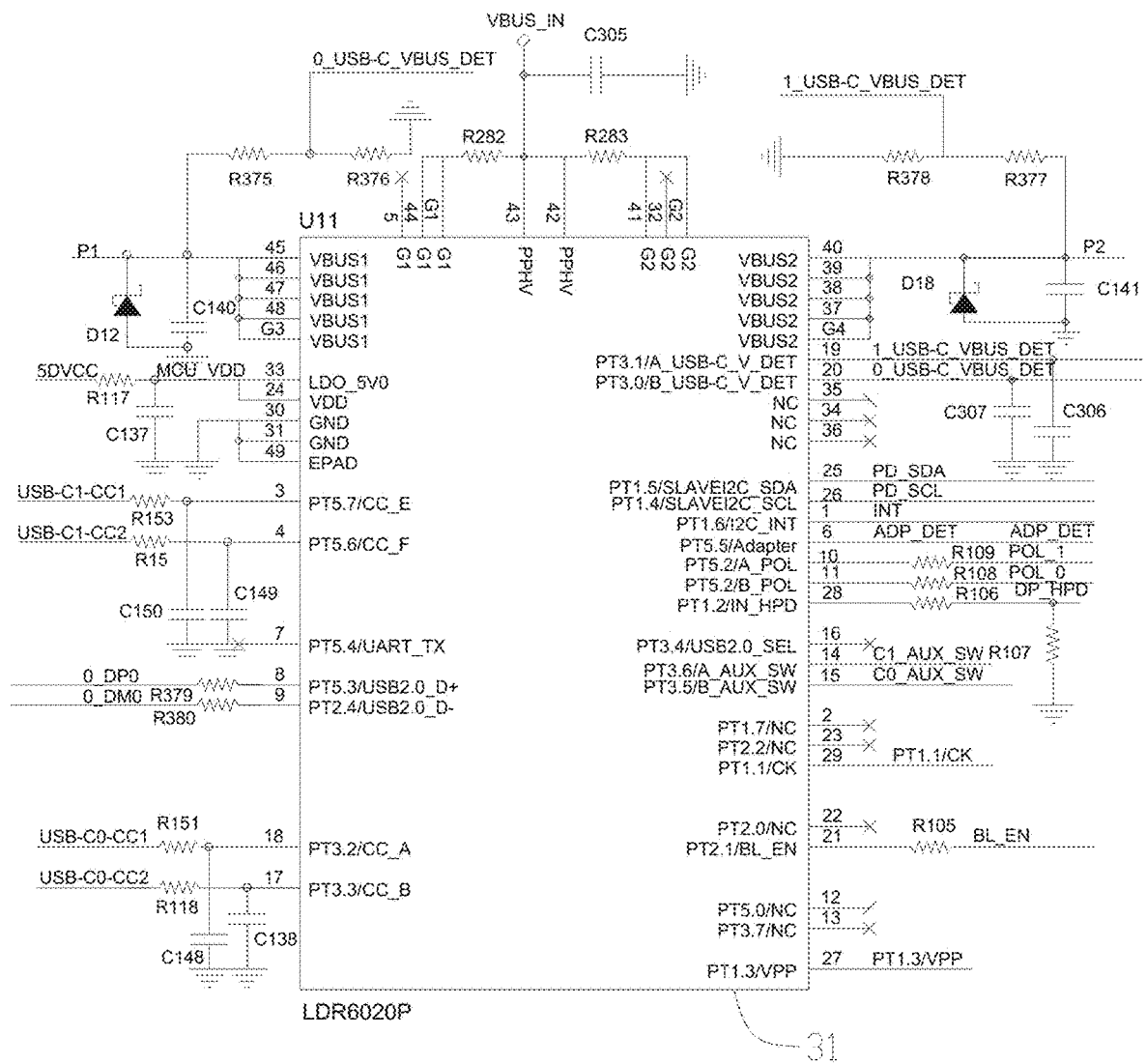
FIG. 6 is a circuit diagram of a protocol chip and its peripheral circuits of the present invention.
Figure 7:
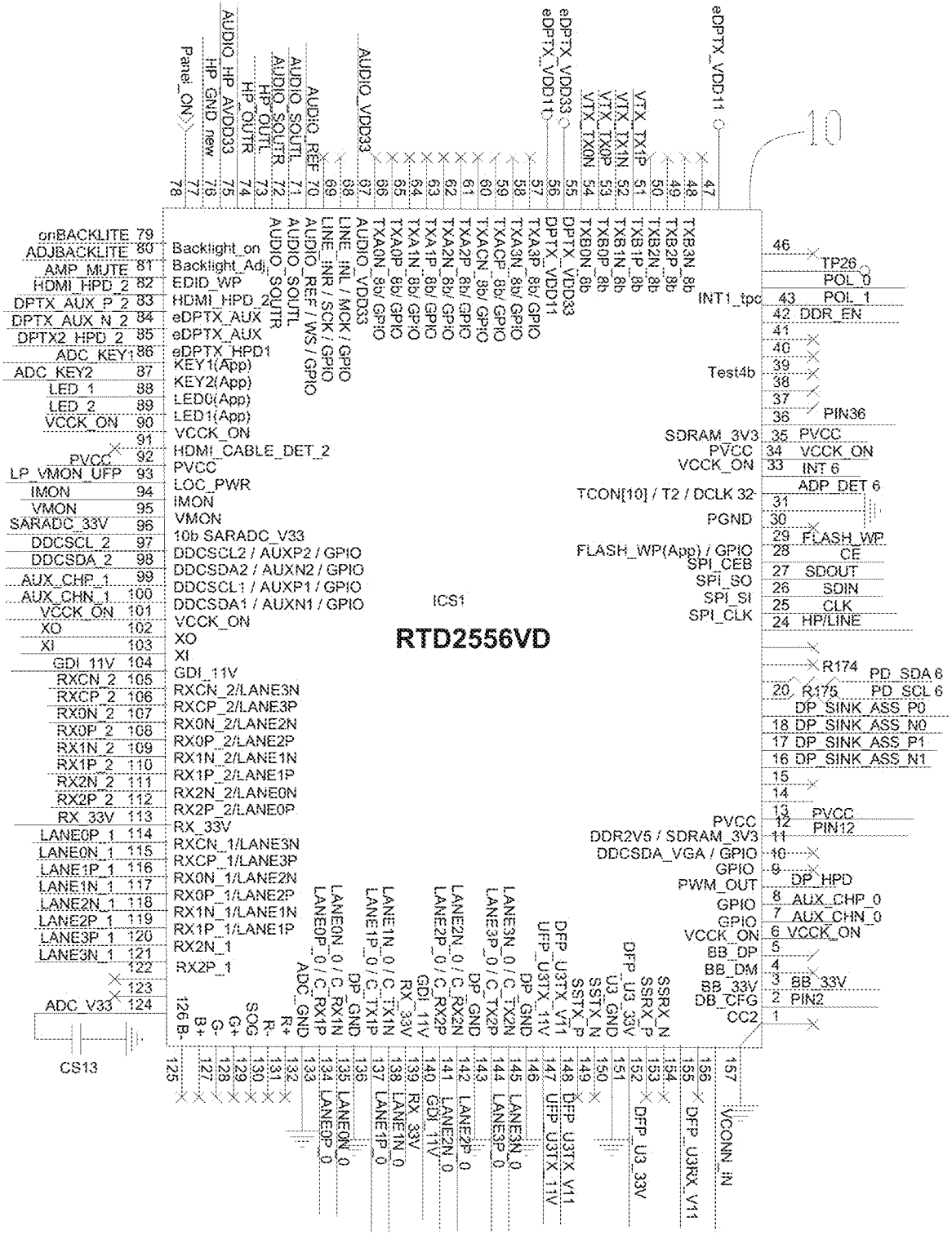
FIG. 7 is a circuit diagram of a display controller and its peripheral circuits according to the present invention.
Figure 8:
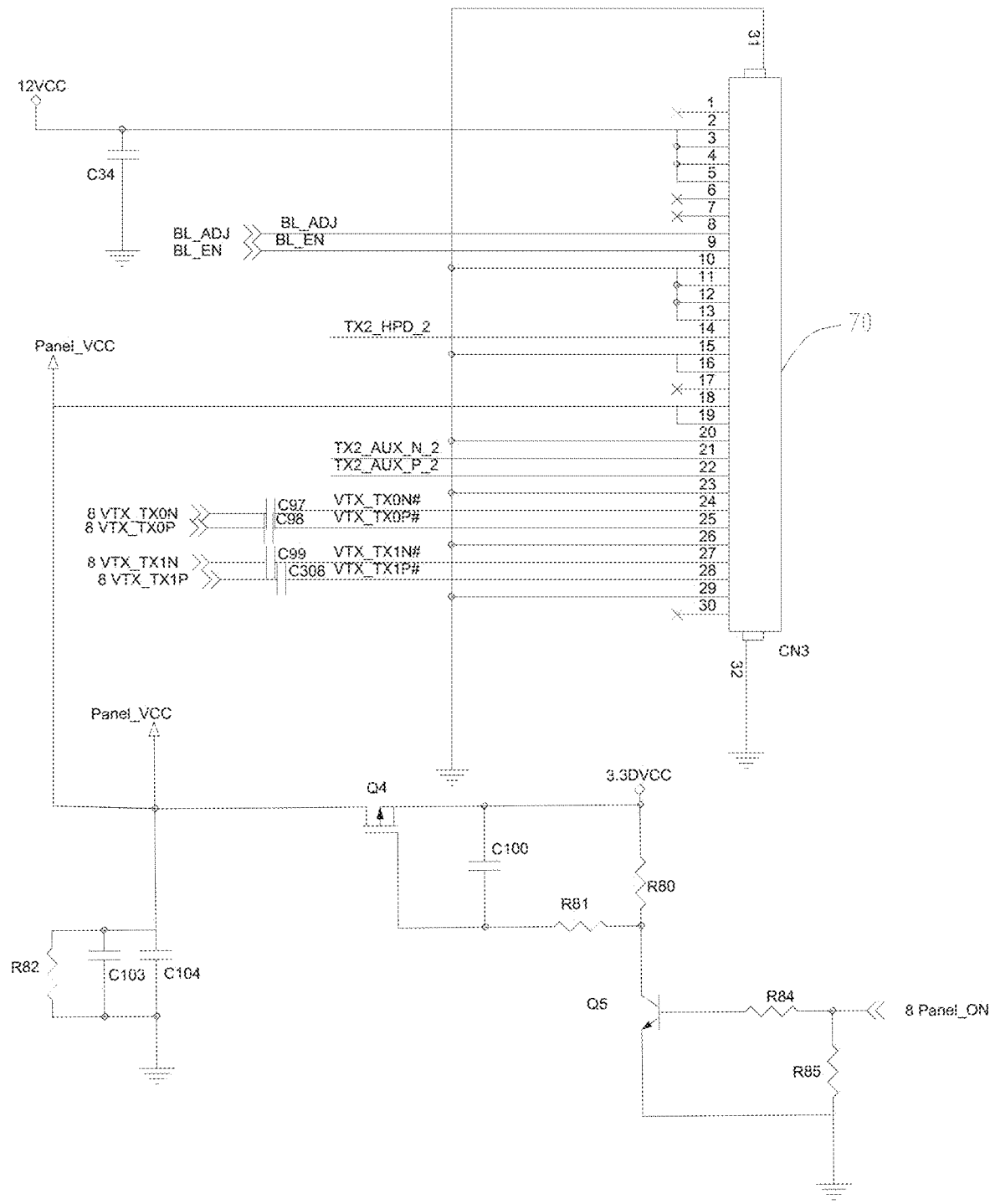
FIG. 8 is a circuit diagram of a screen interface of the present invention.
Figure 9:
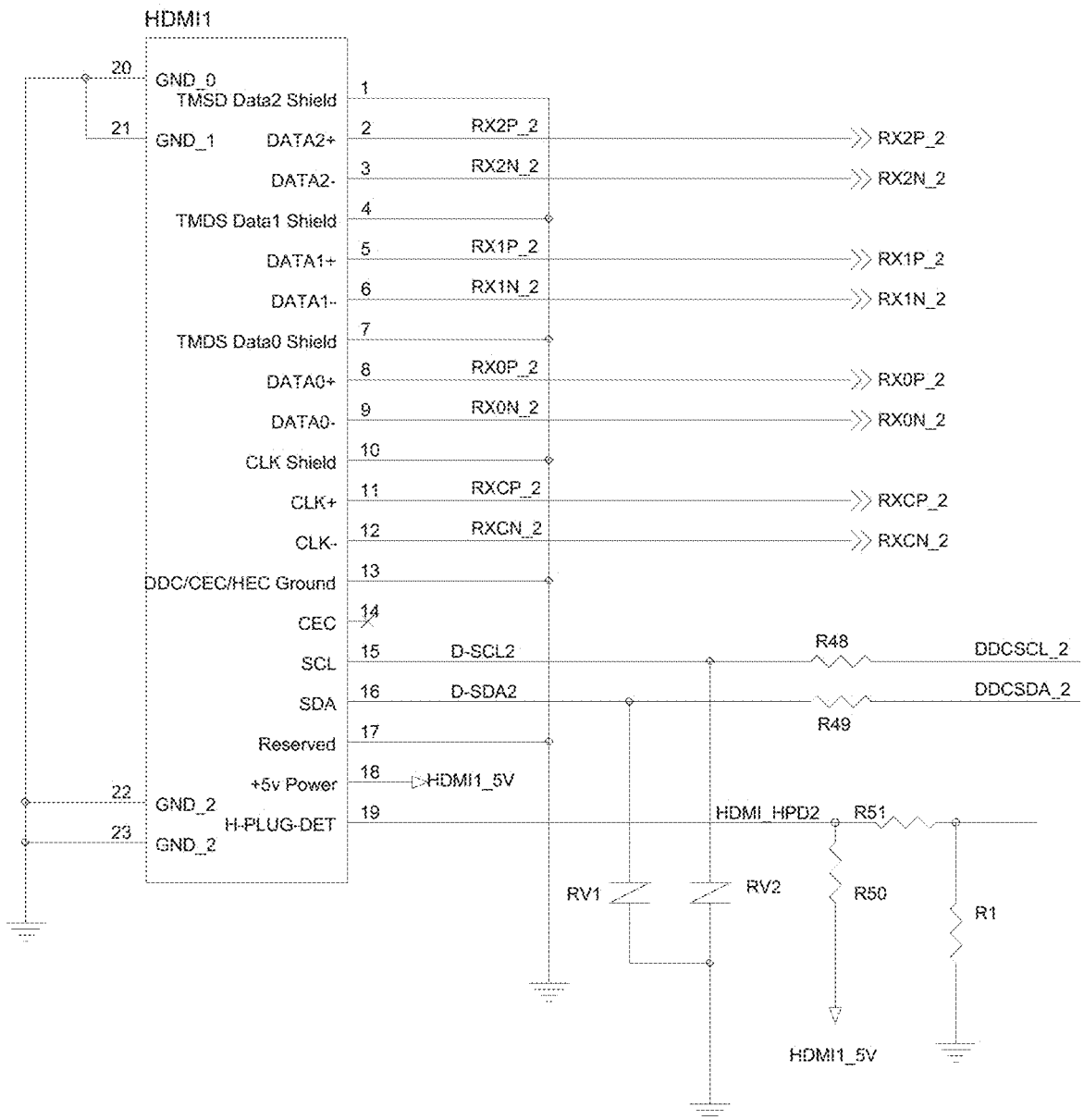
FIG. 9 is a circuit diagram of a third device interface of the present invention.

It will be appreciated that for simplicity and clarity of illustration, where appropriate, reference numerals have been repeated among the different figures to indicate corresponding or analogous elements. In addition, numerous specific details are set forth in order to provide a thorough understanding of the exemplary embodiments described herein. However, it will be understood by those of ordinary skill in the art that the exemplary embodiments described herein may be practiced without these specific details. In other instances, methods, procedures, and components have not been described in detail so as not to obscure the related relevant feature being described. Also, the description is not to be considered as limiting the scope of the exemplary embodiments described herein. The drawings are not necessarily to scale and the proportions of certain parts may be exaggerated to better illustrate details and features of the present disclosure.

The term "comprising" when utilized, means "including, but not necessarily limited to"; it specifically indicates open-ended inclusion or membership in the so-described combination, group, series, and the like. The disclosure is illustrated by way of example and not by way of limitation in the figures of the accompanying drawings in which like references indicate similar elements. It should be noted that references to "an" or "one" embodiment in this disclosure are not necessarily to the same embodiment, and such references can mean "at least one". In addition, the terms "first" and "second" are used for descriptive purposes only and cannot be understood as indicating or implying relative importance or implying the number of indicated technical features. Thus, the features defined as "first" and "second" may explicitly or implicitly include one or more of the features. In the description of embodiments of the application, "a plurality of" means two or more, unless otherwise specifically defined.

Referring to FIGS. 1-20, a video projection switching apparatus 100 is provided in an embodiment of the present invention.

The video projection switching apparatus 100 includes a screen interface 70, a display controller 10, a power module 30, a switching unit 80, and a plurality of input interfaces 20. At least two input interfaces 20 of the plurality of input interfaces 20 are electrically connected to the display controller 10 and used for connecting to external input devices to input video signals. At least one input interface 20 of the plurality of input interfaces 20 is electrically connected to the power module 30 and used for connecting to a power supply. The screen interface 70 is used for connecting to a display screen. The display controller 10 is electrically connected to the power module 30, the switching unit 80, and the screen interface 70, respectively. When at least two input interfaces 20 of the plurality of input interfaces both input video signals, the display controller 10 first outputs a video signal input from one input interface 20 of the at least two input interfaces 20 through the screen interface 70 according to a preset program. The switching unit 80 outputs a switching signal to the display controller 10 when a user operates. When the display controller 10 receives the switching signal, the display controller 10 selects to output a video signal input from another input interface 20 of the at least two input interfaces 20 through the screen interface 70. The power module 30 processes power input from one input interface 20 of the at least one input interface 20 and then supplies the power to the display controller 10 for use.

In this embodiment, the plurality of input interfaces are configured for inputting a plurality of video signals, and the signals are transmitted to the display controller 10. The display controller 10 first specifies one of the video signals to be transmitted to the display screen for display through the screen interface 70 according to the internal preset program. The display controller 10 selects to output the video signal input from another input interface 20 through the screen interface 70 when receiving the switching signal. In this way, during a meeting or when the user has a plurality of hosts, the video projection switching apparatus 100 in this embodiment can simultaneously be connected to a plurality of input devices, so that one display screen shows the video signals output from the input devices that the user needs to project onto the screen. This solves the problem of cumbersome operation of connecting a data cable that is connected to the display screen to a corresponding input device when each input device needs to project a video signal onto the screen, making it convenient for the user to use, saving meeting time, and improving meeting efficiency. Specifically, the input devices can be computers, mobile phones, etc.

The video projection switching apparatus in this embodiment may also have only one input interface to input a video signal in the process of use. At this time, the display controller defaults to outputting the video signal input from this input interface through the screen interface, so that the device can also be adapted for use with one input device.

In one embodiment, the preset program is set that when at least two input interfaces 20 of the plurality of input interfaces 20 both input video signals, the display controller 10 outputs a video signal, which is input first, through the screen interface 70. It should be understood that when one input interface 20 is first connected to input device one, and then another input interface 20 is connected to input device two, the display controller 10 outputs a video signal input from the input device one through the screen interface 70, so that the display screen displays an image of a screen of the device one.

In one embodiment, the preset program is set that when at least two input interfaces 20 of the plurality of input interfaces 20 both input video signals, the display controller 10 outputs a video signal, which is input last, through the screen interface 70. It should be understood that when one input interface 20 is first connected to input device one, and then another input interface 20 is connected to input device two, the display controller 10 outputs a video signal input from the input device two through the screen interface 70, so that the display screen displays an image of a screen of the device two.

In one embodiment, the preset program is set that when at least one input interface 20 of the plurality of input interfaces 20 inputs a video signal, the display controller 10 outputs a video signal input from a specified input interface 20 through the screen interface 70. For example, the preset program specifies that a video signal of a device connected to a second one of the input interfaces 20 be output through the screen interface 70. That is, when one input interface 20 is first connected to input device one, then another input interface 20 is connected to input device two, and finally another input interface 20 is connected to input device three, the display controller 10 outputs a video signal input from the input device two through the screen interface 70, so that the display screen displays an image of a screen of the device two. Of course, a manufacturer or the user may customize the setting of the preset program to specify from which input interface 20 a video signal input to be output through the screen interface 70 according to needs. The preset program is not limited here.

In one embodiment, the switching unit 80 is a switch. The switch can be a button switch, a touch switch, etc. After the user presses or touches the switch, an image displayed on the display screen is switched through the display controller 10.

In one embodiment, the power module 30 is also electrically connected to the screen interface 70, and the power module 30 also processes power input from the input interface 20 and then supplies the power to the display screen through the screen interface 70. Therefore, the video projection switching apparatus 100 in this embodiment can also supply power to the display screen, without a need for the display screen to be connected to another socket for power supply after the present embodiment is connected to the power supply, thereby reducing wiring and not occupying a position of the socket.

Referring to FIGS. 1-9, in one embodiment, the input interface 20 includes a first device interface 21 and a second device interface 23. The display controller 10 and the power module 30 are both electrically connected to the first device interface 21 and the second device interface 23. The first device interface 21 and the second device interface 23 are both used for connecting to external devices and for inputting video signals and/or power from the input devices. The power module 30 includes a protocol chip 31 and a power circuit 40. The protocol chip 31 is electrically connected to the first device interface 21, the second device interface 23, the display controller 10, and the power circuit 40, respectively. The power circuit 40 is also electrically connected to the display controller 10 and the screen interface 70. The protocol chip 31 is used for transmitting power input from the first device interface 21 or the second device interface 23 to the display controller 10 and the screen interface 70 through the power circuit 40. In this way, after the first device interface 21 and/or the second device interface 23 are connected to the input device and the input device has power output, the protocol chip 31 can transmit the power input from the first device interface 21 or the second device interface 23 to the display controller 10 and the screen interface 70 through the power circuit 40 for use, so that the video projection switching apparatus 100 of this embodiment can be powered on and work, and the video projection switching apparatus 100 of this embodiment does not need to be connected to a power supply again, reducing wiring and facilitating the use of the user.

In one embodiment, when the protocol chip 31 detects that the input device is a charging device through the first device interface 21, the protocol chip 31 outputs power input from the second device interface 23 through the first device interface 21. Specifically, the protocol chip 31 also communicates with the input device through the first device interface 21 to understand charging power of the input device, so as to output appropriate power to the input device through the first device interface 21. If the protocol chip 31 detects that the input device has fast charging function through the first device interface 21, the protocol chip 31 can output fast charging power to the input device through the first device interface 21 to charge the input device. If the input device connected to the first device interface 21 can support power charging of 65 W or 100 W, the protocol chip 31 outputs power of 65 W or 100 W to the input device through the first device interface 21.

In one embodiment, when the protocol chip 31 detects that the input device is a charging device through the second device interface 23, the protocol chip 31 outputs the power input from the first device interface 21 through the second device interface 23. Specifically, the protocol chip 31 also communicates with the input device through the second device interface 23 to understand charging power of the input device, so as to output appropriate power to the input device through the second device interface 23. If the protocol chip 31 detects that the input device has fast charging function through the second device interface 23, the protocol chip 31 can output fast charging power to the input device through the second device interface 23 to charge the input device. If the input device connected to the second device interface 23 can support power charging of 65 W or 100 W, the protocol chip 31 outputs power of 65 W or 100 W to the input device through the second device interface 23.

In the above embodiment, both the first device interface 21 and the second device interface 23 are Type-c interfaces, so that video signals can be transmitted while power can also be transmitted.

In one embodiment, the video projection switching apparatus further includes a first electrostatic protection component 211 and a second electrostatic protection component 231. The first electrostatic protection component 211 is electrically connected to the first device interface 21, and the second electrostatic protection component 231 is electrically connected to the second device interface 23. By using the first electrostatic protection component 211 and the second electrostatic protection component 231 to provide electrostatic protection for the first device interface 21 and the second device interface 23, respectively, it can ensure that the protocol chip 31 is not damaged by static electricity during fast charging. Specifically, both the first electrostatic protection component 211 and the second electrostatic protection component 231 can be ESD protection chips, chips of SCS642U06 model, etc.

In one embodiment, the input interface 20 further includes a third device interface 22 for connecting to an external input device. The third device interface 22 is electrically connected to the display controller 10 for transmitting a video signal transmitted from the input device to the display controller 10.

Specifically, the third device interface 22 is an HDMI interface, so that more input devices can be connected for use, such as projectors, set-top boxes, and other devices.

In the above embodiment, the display controller 10 is an eDP driver chip to realize that the input interface 20 configured in this embodiment to input video signals, and the input video signals are output to the display screen through the screen interface 70.

In the above embodiment, the eDP driver chip is used for supporting connection of two DP1.4 digital input interfaces 20 with HDCP1.4 and one HDMI1.4 digital input interface 20 with HDCP1.4, and is used for supporting a screen interface 70 with an output connection resolution of 1920× 1080 @ 60 hz, so that a plurality of input interfaces 20 can be configured for use in this embodiment, and a resolution of an image displayed on the display screen can reach 1920×1080 @ 60 hz, improving the clarity of displaying. Specifically, eDP driver chips can be selected from chips of RTD2556VD and RTD2556QR and other models, and the protocol chip 31 can be selected from chips of LRD6020 and LDR6282 and other models.

Figure 11:
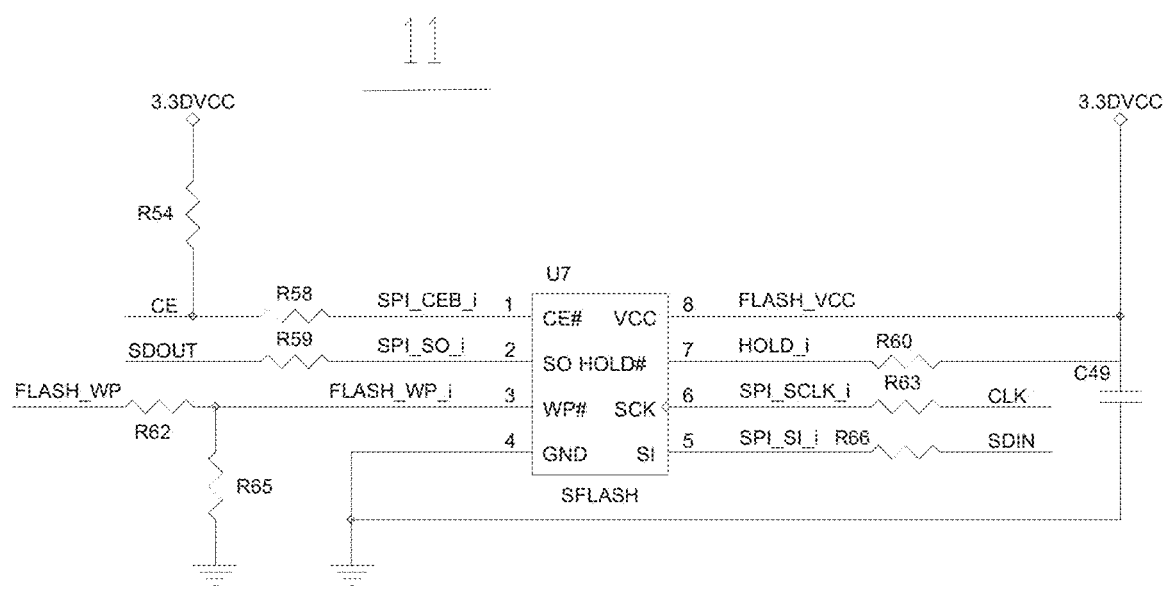
FIG. 11 is a circuit diagram of a memory of the present invention.
Figure 12:
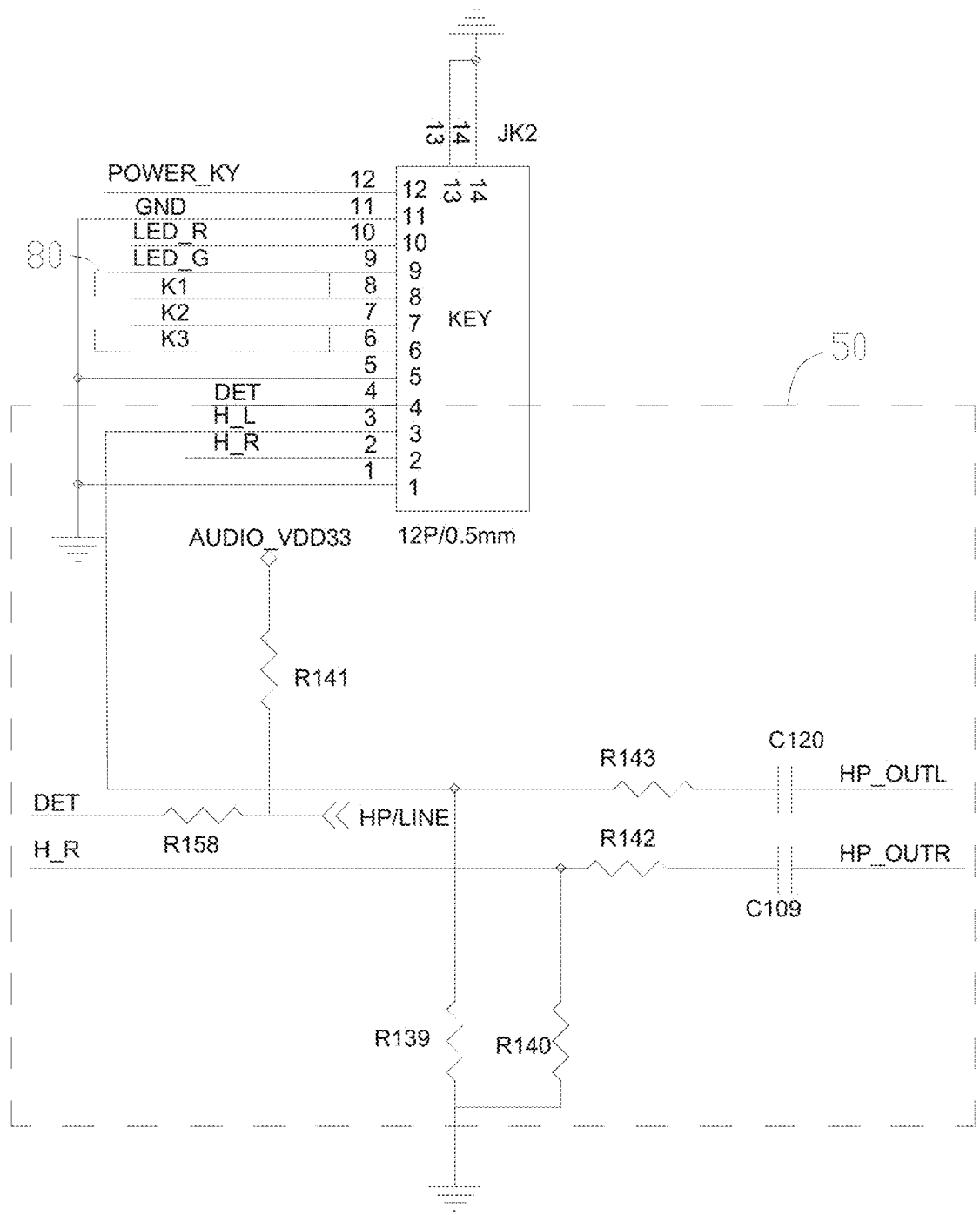
FIG. 12 is a circuit diagram of an earphone interface and output of a switching unit of the present invention.
Figure 13:
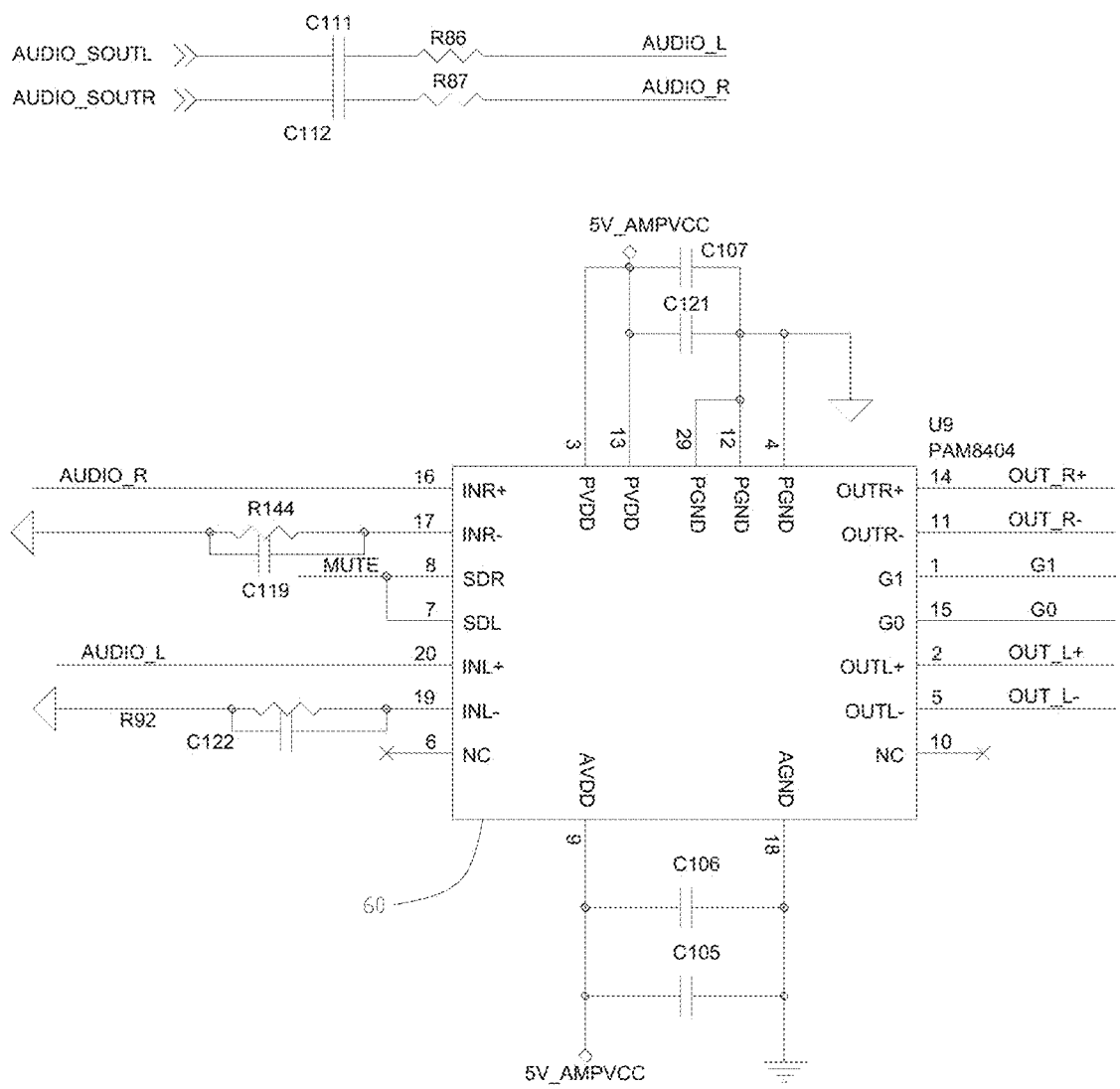
FIG. 13 is a circuit diagram of an audio amplifier of the present invention.
Figure 14:
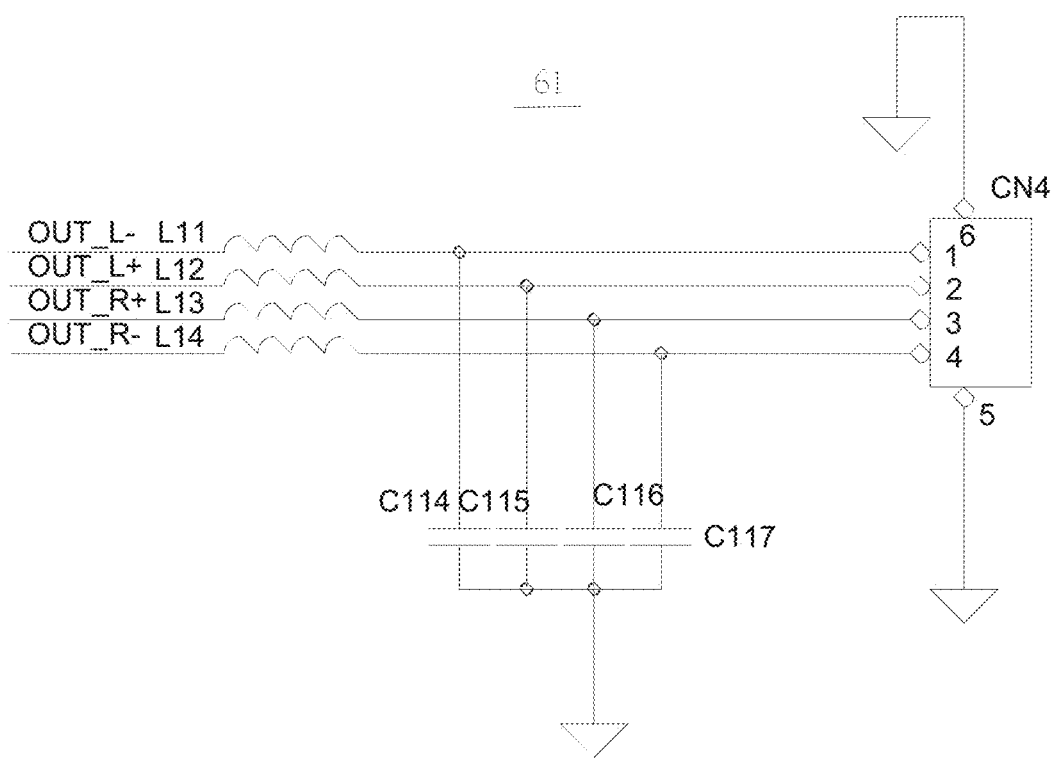
FIG. 14 is a circuit diagram of a player interface of the present invention.
Figure 15:
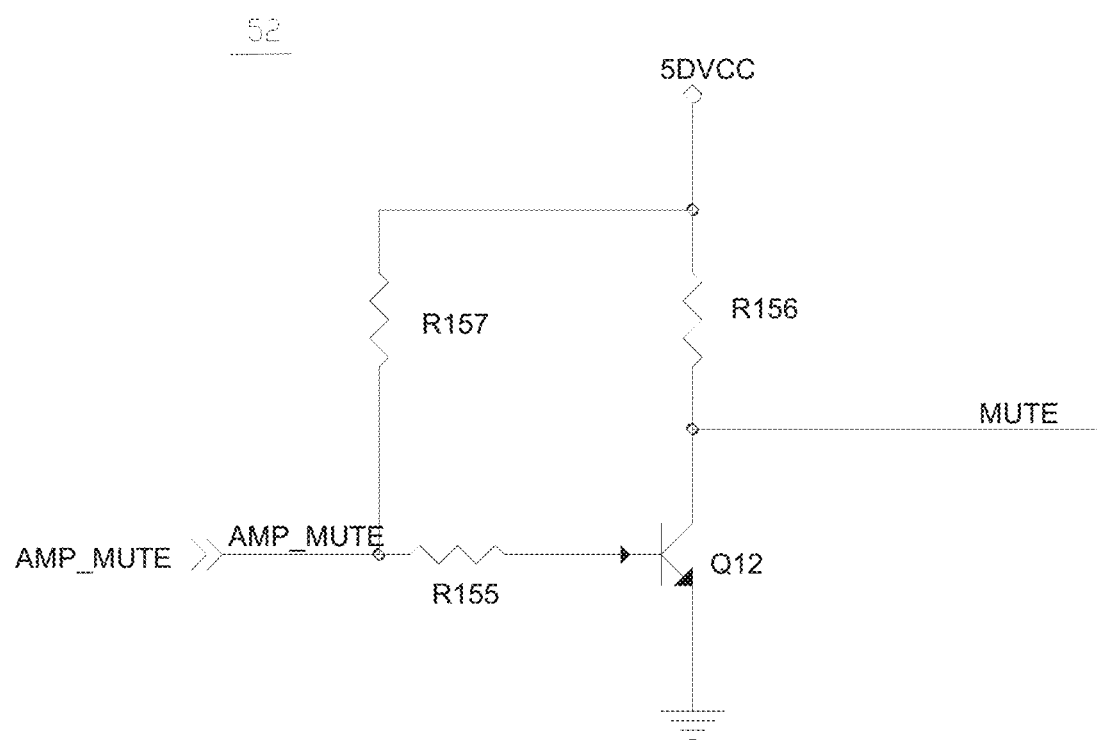
FIG. 15 is a circuit diagram of a switch unit of the present invention.
Figure 16:
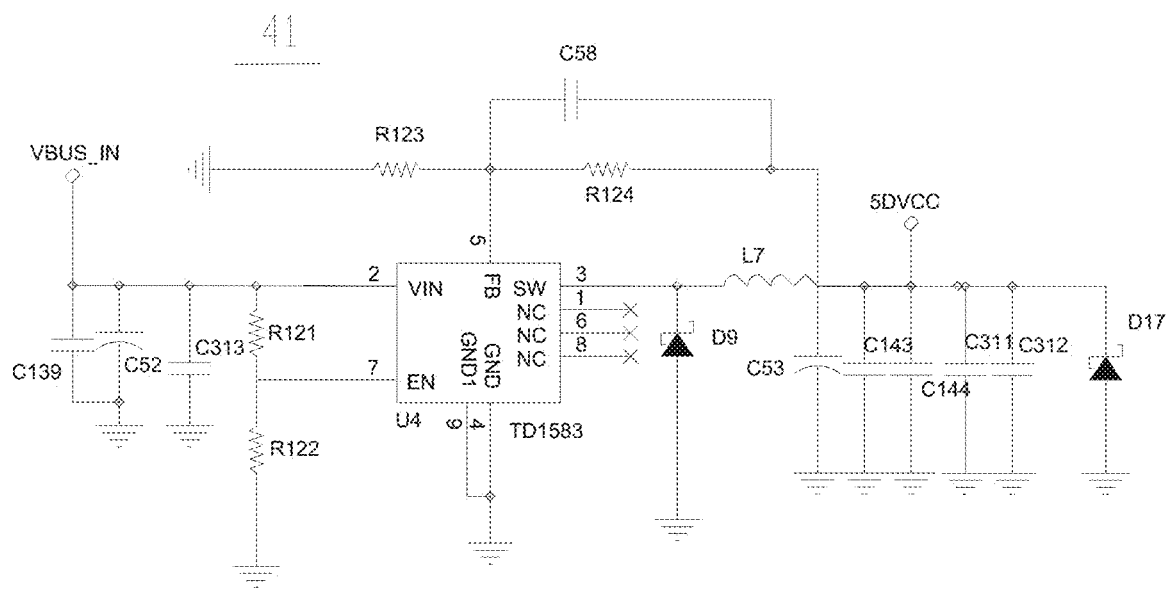
FIG. 16 is a circuit diagram of a first power unit of the present invention.
Figure 17:
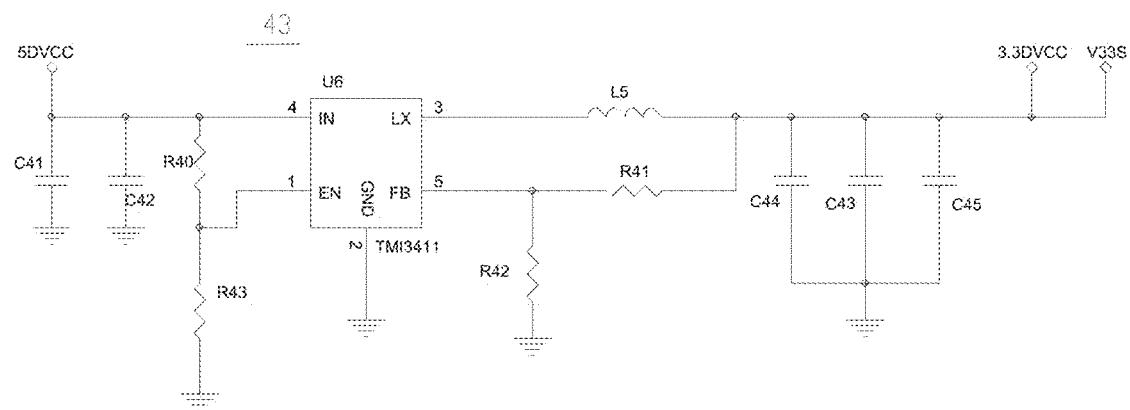
FIG. 17 is a circuit diagram of a second power unit of the present invention.
Figure 18:
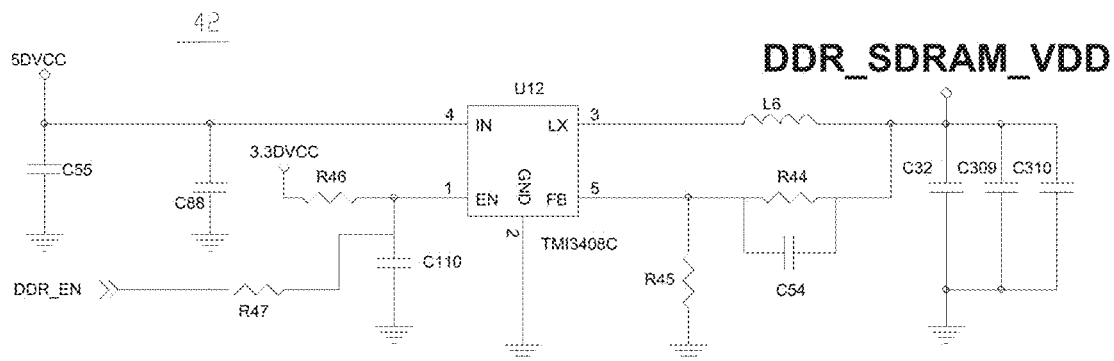
FIG. 18 is a partial circuit diagram of a peripheral power unit of the present invention.
Figure 19:
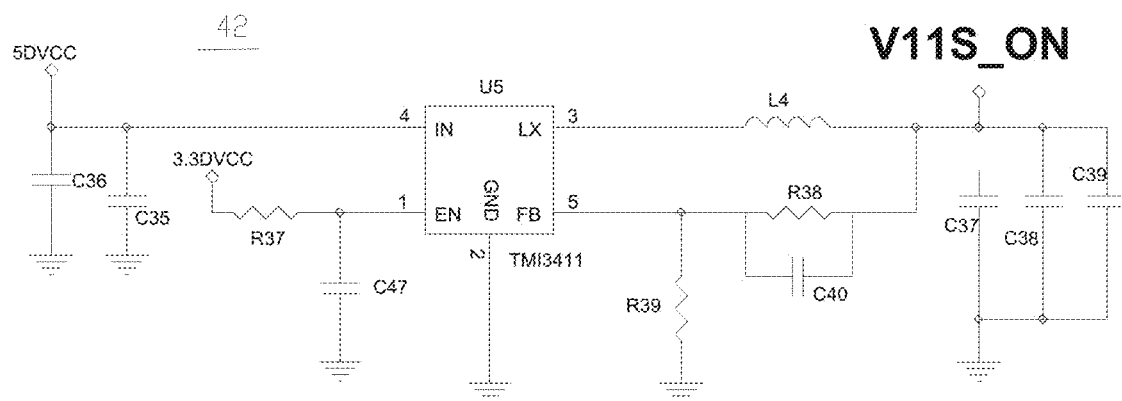
FIG. 19 is a partial circuit diagram of a peripheral power unit of the present invention.
Figure 20:
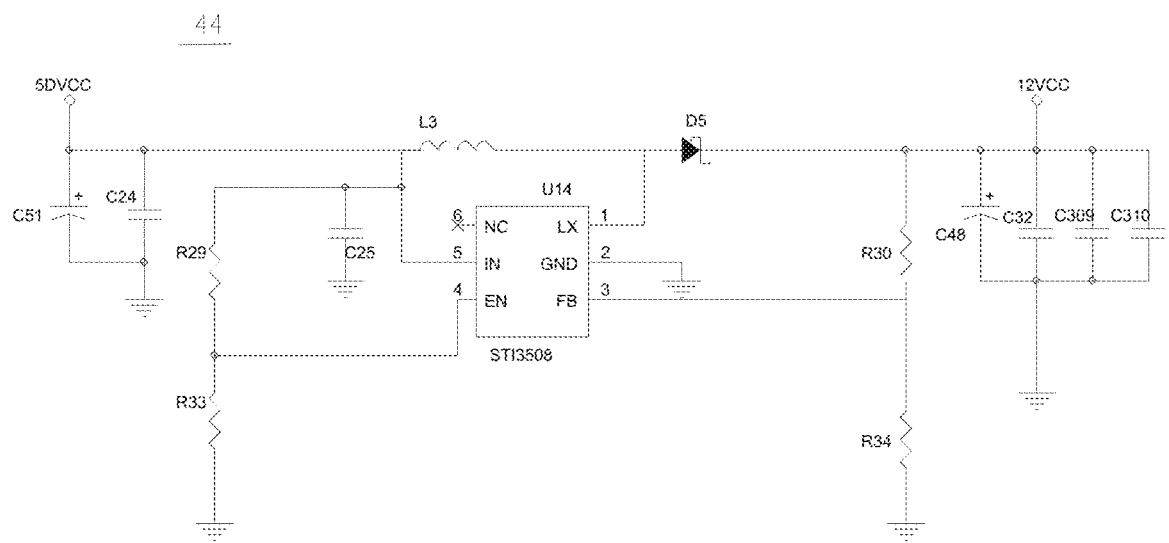
FIG. 20 is a circuit diagram of a third power unit of the present invention.

In the above embodiment, referring to FIG. 1 and FIG. 11, the video projection switching apparatus 100 further includes a memory 11 for storing data. The memory 11 is electrically connected to the display controller 10 for storing programs and data, etc. of the display controller 10.

Figure 10:
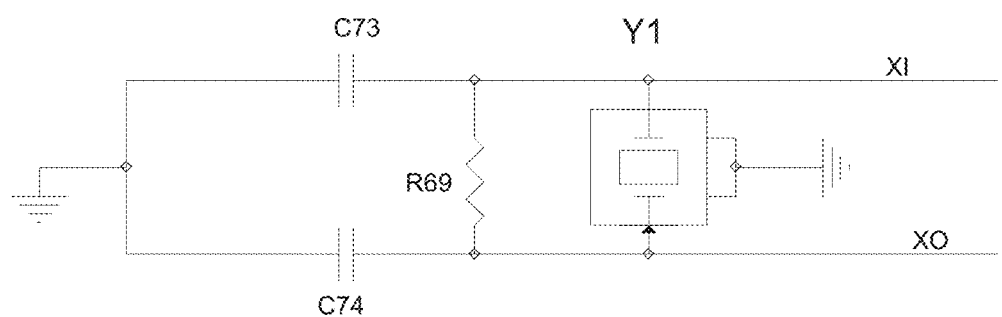
FIG. 10 is a circuit diagram of a clock unit of the present invention.

In the above embodiment, referring to FIG. 1 and FIG. 10, the video projection switching apparatus 100 further includes a clock unit 12. The clock unit 12 is electrically connected to the display controller 10 to facilitate the orderly operation of the video projection switching apparatus 100 in this embodiment.

Referring to FIG. 1 and FIGS. 16-20, in the above embodiment, the power circuit 40 includes a first power unit 41, a second power unit 43, a peripheral power unit 42, and a third power unit 44. The first power unit 41 is electrically connected to the second power unit 43, the peripheral power unit 42, the third power unit 44, and the protocol chip 31, respectively. The protocol chip 31 processes the power input from the first device interface 21 or the second device interface 23 into a first voltage and outputs the first voltage to the first power unit 41. The first power unit 41 is used for processing the first voltage into a second voltage and outputting the second voltage to the second power unit 43, the peripheral power unit 42, and the third power unit 44, respectively. The second power unit 43 is used for processing the second voltage into a third voltage for use by the display controller 10. The peripheral power unit 42 is used for processing the second voltage into a peripheral voltage for use by the display controller 10. The third power unit 44 is used for processing the second voltage into a fourth voltage and then outputting the fourth voltage through the screen interface 70.

Specifically, the first power unit 41, the second power unit 43, the peripheral power unit 42, and the third power unit 44 are all power management circuits. The power input from the first device interface 21/the second device interface 23 is formed into VBUS-IN through the protocol chip 31 and then is output to the first power unit 41. The first power unit 41 converts the VBUS-IN into 5 DVCC (i.e. 5V) and then transmits the 5 DVCC to the second power unit 43, the peripheral power unit 42, and the third power unit 44, respectively. The second power unit 43 converts the 5 DVCC into 3.3 DVCC (i.e. 3.3V) and transmits the 3.3 DVCC to the display controller 10 for use. The peripheral power unit 42 converts the 5 DVCC into V11S_ON (V11S_ON is 1.1V) and DDR_SDRAM_VDD (DDR_S-DRAM_VDD is 2.5V) and then transmits them to the display controller 10 for use. The third power unit 44 converts the 5 DVCC to 12 VCC and then supply the 12 VCC to the display screen for use through the screen interface 70 to enable the display screen of this embodiment to be powered on and work.

Referring to FIG. 1 and FIGS. 12-15, in one embodiment, the video projection switching apparatus 100 further includes an audio amplifier 60 and a player interface 61 for connecting to an audio player. The audio amplifier 60 is electrically connected to the first power unit 41, the player interface 61, and the display controller 10, respectively. The display controller 10 is also used for amplifying audio data input from the input interface 20 through the audio amplifier 60 and then outputting the audio data through the player interface 61. Specifically, the player is a speaker, a loudspeaker box, or the like, to enable the video projection switching apparatus 100 in this embodiment to play the audio input from the input device, thereby improving the practicality of the video projection switching apparatus 100 in this embodiment. The first power unit 41 supplies 5 DVCC voltage to the audio amplifier 60 for use.

In one embodiment, the video projection switching apparatus 100 further includes an earphone interface 50 for connecting to an external earphone. The earphone interface 50 is electrically connected to the display controller 10. The display controller 10 is also used for outputting the audio data input from the input interface 20 through the earphone interface 50, so that the user can use by wearing the earphone.

In an embodiment with the player interface 61 and the earphone interface 50, the video projection switching apparatus 100 further includes a switch unit 52. The switch unit 52 is electrically connected to the display controller 10 and the audio amplifier 60, respectively. The display controller 10 is also used for outputting a cut-off signal to the audio player through the switch unit 52 when the display controller 10 detects that the earphone interface 50 is connected to the earphone. The audio amplifier 60 receives the cut-off signal and stops outputting the audio data through the player interface 61 to stop playing audio through the speaker, enabling audio to be played from the earphone for the user to use when the audio is not required to be played through the speaker.

The above description only describes embodiments of the present disclosure, and is not intended to limit the present disclosure; various modifications and changes can be made to the present disclosure. Any modifications, equivalent substitutions, and improvements made within the spirit and scope of the present disclosure are intended to be included within the scope of the present disclosure.

What is claimed is:

1. A video projection switching apparatus, comprising a screen interface, a display controller, a power module, a switching unit, and a plurality of input interfaces;
   wherein at least two input interfaces of the plurality of input interfaces are electrically connected to the display controller and used for connecting to external input devices to input video signals; at least one input interface of the plurality of input interfaces is electrically connected to the power module and used for connecting to a power supply; the screen interface is used for connecting to a display screen; and the display controller is electrically connected to the power module, the switching unit, and the screen interface, respectively;
   when at least two input interfaces both input video signals, the display controller first outputs a video signal input from one input interface of the at least two input interfaces through the screen interface according to a preset program; the switching unit outputs a switching signal to the display controller when a user operates, and when the display controller receives the switching signal, the display controller selects to output a video signal input from another input interface of the at least two input interfaces through the screen interface; and the power module processes power input from one input interface of the at least one input interface and then supplies the power to the display controller for use.

2. The video projection switching apparatus according to claim 1, wherein the preset program is set that when at least two input interfaces both input video signals, the display controller outputs a video signal, which is input first or last, through the screen interface.

3. The video projection switching apparatus according to claim 1, wherein the preset program is set that when at least two input interfaces both input video signals, the display controller specifies a video signal input from one input interface of the at least two input interfaces to be output through the screen interface.

4. The video projection switching apparatus according to claim 1, wherein the switching unit is a switch.

5. The video projection switching apparatus according to claim 1, wherein the power module is also electrically connected to the screen interface, and the power module also processes power input from the input interface and then supplies the power to the display screen through the screen interface.

6. The video projection switching apparatus according to claim 5, wherein the input interface comprises a first device interface and a second device interface, and the display controller and the power module are both electrically connected to the first device interface and the second device interface; the first device interface and the second device interface are both used for connecting to external devices and for inputting video signals and/or power from the input devices; the power module comprises a protocol chip and a power circuit; the protocol chip is electrically connected to the first device interface, the second device interface, the display controller, and the power circuit, respectively; and the power circuit is also electrically connected to the display controller and the screen interface;

the protocol chip is used for transmitting power input from the first device interface or the second device interface to the display controller and the screen interface through the power circuit.

7. The video projection switching apparatus according to claim 6, wherein when the protocol chip detects that the input device is a charging device through the first device interface, the protocol chip outputs power input from the second device interface through the first device interface.

8. The video projection switching apparatus according to claim 6, wherein when the protocol chip detects that the input device is a charging device through the second device interface, the protocol chip outputs the power input from the first device interface through the second device interface.

9. The video projection switching apparatus according to claim 6, wherein both the first device interface and the second device interface are Type-c interfaces.

10. The video projection switching apparatus according to claim 6, further comprising a first electrostatic protection component and a second electrostatic protection component, wherein the first electrostatic protection component is electrically connected to the first device interface, and the second electrostatic protection component is electrically connected to the second device interface.

11. The video projection switching apparatus according to claim 6, wherein the power circuit comprises a first power unit, a second power unit, a peripheral power unit, and a third power unit; and the first power unit is electrically connected to the second power unit, the peripheral power unit, the third power unit, and the protocol chip, respectively;

the protocol chip processes the power input from the first device interface or the second device interface into a first voltage and outputs the first voltage to the first power unit; the first power unit is used for processing the first voltage into a second voltage and outputting the second voltage to the second power unit, the peripheral power unit, and the third power unit, respectively; the second power unit is used for processing the second voltage into a third voltage for use by the display controller, the peripheral power unit is used for processing the second voltage into a peripheral voltage for use by the display controller, and the third power unit is used for processing the second voltage into a fourth voltage and then outputting the fourth voltage through the screen interface.

12. The video projection switching apparatus according to claim 6, further comprising an audio amplifier and a player interface for connecting to an audio player, wherein the audio amplifier is electrically connected to the power module, the player interface, and the display controller, respectively; and the display controller is also used for amplifying audio data input from the input interface through the audio amplifier and then outputting the audio data through the player interface.

13. The video projection switching apparatus according to claim 12, further comprising an earphone interface for connecting to an external earphone, wherein the earphone interface is electrically connected to the display controller; and the display controller is also used for outputting the audio data input from the input interface through the earphone interface.

14. The video projection switching apparatus according to claim 13, further comprising a switch unit, wherein the switch unit is electrically connected to the display controller and the audio amplifier, respectively; the display controller is also used for outputting a cut-off signal to the audio player through the switch unit when the display controller detects that the earphone interface is connected to the earphone; and the audio amplifier receives the cut-off signal and stops outputting the audio data through the player interface.

15. The video projection switching apparatus according to claim 6, further comprising a memory for storing data, wherein the memory is electrically connected to the display controller.

16. The video projection switching apparatus according to claim 6, further comprising a clock unit, wherein the clock unit is electrically connected to the display controller.

17. The video projection switching apparatus according to claim 1, wherein the input interface further comprises a third device interface for connecting to an external input device; and the third device interface is electrically connected to the display controller for transmitting a video signal transmitted from the input device to the display controller.

18. The video projection switching apparatus according to claim 17, wherein the third device interface is an HDMI interface.

19. The video projection switching apparatus according to claim 1, wherein the display controller is an eDP driver chip.

20. The video projection switching apparatus according to claim 19, wherein the eDP driver chip is used for supporting connection of two DP1.4 digital input interfaces with HDCP1.4 and one HDMI1.4 digital input interface with HDCP1.4, and is used for supporting a screen interface with an output connection resolution of 1920×1080 @ 60 hz.

* * * * *